United States Patent [19]

Kasai et al.

[11] 4,034,065

[45] July 5, 1977

[54] PREPARATION OF CU+ ZEOLITES

[75] Inventors: Paul Haruo Kasai, White Plains; James Nelson Francis, Peekskill; Roland Justin Bishop, Jr., Hauppauge, all of N.Y.

[73] Assignee: Union Carbide Corporation, New York, N.Y.

[22] Filed: Sept. 26, 1975

[21] Appl. No.: 617,083

[52] U.S. Cl. ............................ 423/328; 252/455 Z
[51] Int. Cl.² ...................................... C01B 33/28
[58] Field of Search ............................ 423/328, 329; 252/455 Z; 55/75

[56] References Cited

UNITED STATES PATENTS

| | | | |
|---|---|---|---|
| 3,013,985 | 12/1961 | Breck | 252/455 Z |
| 3,253,887 | 5/1966 | Mattox et al. | 252/455 Z |
| 3,497,462 | 2/1970 | Kruerke | 252/455 Z |
| 3,551,353 | 12/1970 | Chen et al. | 252/455 Z |
| 3,702,886 | 11/1972 | Argauer et al. | 423/328 |
| 3,783,125 | 1/1974 | Ondrey et al. | 252/455 Z X |

*Primary Examiner*—Edward J. Meros
*Attorney, Agent, or Firm*—Richard G. Miller

[57] ABSTRACT

The $Cu^{++}$ cations of highly siliceous zeolites are found to undergo spontaneous reduction to $Cu^+$ cations upon dehydration and to produce oxygen by oxidation of water.

3 Claims, No Drawings

PREPARATION OF CU+ ZEOLITES

The present invention relates to the formation of $Cu^+$ cation forms of zeolitic molecular sieves and more particularly to the method for preparing same.

In U.S. Pat. No. 3,497,462, issued Feb. 24, 1970 to U. K. Kruerke, two methods for preparing $Cu^+$ forms of zeolites are disclosed which avoid the problems involved in attempting to prepare these zeolite forms by either conventional aqueous medium ion exchange or reduction of $Cu^{++}$ cations in situ using hydrogen. In general the techniques proposed by the aforesaid patent comprise (a) cation exchange of a dehydrated zeolite using cuprous iodide in a non-aqueous medium such as acetonitrile, liquid sulfur dioxide and N, N-dimethylformamide, or (b) reducing a $Cu^{++}$ zeolite form to the corresponding $Cu^+$ form by contact in the activated, i.e. dehydrated state with liquid ammonia, carbon monoxide, an olefinic hydrocarbon or an acetylenic hydrocarbon. The product $Cu^+$ zeolites are useful both as oxidizing and as reducing agents. It has been proposed to utilize $Cu^+$ zeolites as a general class to adsorb oxidizing agents such as sulfur dioxide as well as reducing agents such as hydrogen sulfide from gas streams in which these substances appear as impurities.

It has now been found that certain zeolitic molecular sieves can be prepared in the $Cu^+$ cation form without the necessity for employing chemical reducing agents which are both expensive and difficult to handle, particularly in commercial scale production.

The embodiment of this finding in the form of the process of the present invention, a crystalline zeolite having pore diameters of at least 4 Angstroms, having framework $SiO_2/Al_2O_3$ molar ratios of from 15 to 200 and containing bivalent copper cations is contacted as a reagent and reacted with water at a temperature of from 200° C up to the crystal destruction temperature of the zeolite, said zeolite reagent containing insufficient water of hydration to stabilize the bivalent copper cations thereof against reaction with said water.

The lower limit of the $SiO_2/Al_2O_3$ molar ratio of the zeolite reagent is a critical factor in the present process. Although we do not wish to be bound by any particular theory, the reaction involved can be considered to take place between the $Cu^{++}$ cations of the zeolite and water as follows

$$2 Cu^{++} + H_2O \rightarrow 2 Cu^+ + 2H^+ + \frac{1}{2} O_2 \qquad (I)$$

With this assumption, the driving force for the reaction can be considered to be electrostatic in character, i.e. one cuprous ion and one hydrogen ion on a zeolite having much less charge separation than is the case with a single divalent copper cation. Unless the aluminate ions of the zeolite framework which are electrovalently balanced by cations are well separated, one divalent copper cation can neutralize the charge on two immediately adjacent aluminate ions quite readily. This mode for establishing electrovalent neutrality within the zeolite structure strongly competes with the alternative mode provided by the presence of one $Cu^+$ cation and one $H^+$ cation, each of which neutralize a different aluminate ion of the framework.

In the present process the oxidation of water and the accompanying reduction of divalent copper cations occurs only after most of the water of hydration is removed from the zeolite, thereby eliminating or greatly lessening the stabilizing influence ordinarily exerted by adsorbed water molecules on zeolitic $Cu^{++}$ cations. Thus the most common mode of operation of the process is to subject a zeolite containing an amount of water sufficient to stabilize the bivalent copper cations of the zeolite to temperatures of from at least 200° C. preferably at least 400° C. up to the crystal destruction temperature of the zeolite and at accompanying pressure conditions to dehydrate the zeolite to the degree that residual water in the zeolite reduces the bivalent copper cations and incidentally evolves oxygen. Dehydration is facilitated by increasing the temperature and lowering the vapor pressure of water vapor over the zeolite mass. Since, however, the evolution of oxygen is as readily determined as is the degree of dehydration, any of an infinite number of combinations of temperature and pressure conditions are easily and routinely arrived at which will be suitable for the practice of the process with a particular zeolite using the evolution of oxygen as the indicia of success. Ordinarily pressures in the range of from essentially nil to 5 atmospheres will be employed.

It is found, however, that if there is free diffusion through the pore system of the zeolite by water molecules, and the dehydration is very rapidly accomplished, it is possible in some cases to dehydrate a zeolite starting material to the extent that there is not enough residual water to contact and react with the bivalent copper cations. In that event, the desired reaction is accomplished by providing extraneous water to the reaction system in an amount sufficient to react with and reduce the $Cu^{++}$ cations but insufficient to stabilize those cations and thus prevent their necessary reduction.

The crystalline zeolitic molecular sieves of the class suitable for use in the practice of this invention are those species which have, or are modified to have, framework $SiO_2/Al_2O_3$ molar ratios of from 15 to 200, preferably from 20 to 100. A number of synthetic zeolite species are available which have sufficiently high $SiO_2/Al_2O_3$ molar ratios in the as-synthesized form. These include zeolite $\Omega$ as defined and disclosed in U.S. patent application Ser. No. 655,318, filed July 24, 1967, zeolites ZSM-5, ZSM-8, ZSM-11 and ZSM-12 as disclosed in detail in U.S. Pat. No. 3,702,886. There are also available a variety of techniques for increasing the Si/Al ratios of zeolite species which have not yet been crystallized in forms sufficiently siliceous for use in this invention. One such method involves steaming the zeolite which is at least partly in the hydrogen cation form at temperatures within the range of 800° to 1500° F. followed by extraction of the thus-loosened alumina from the zeolite structure with dilute mineral acids or organic chelating agents. The procedure is defined in detail in U.S. Pat. No. 3,506,400 issued Apr. 14, 1970. Another method in which a partially decationized form of the zeolite is treated with acetylacetone to extract framework alumina is described in U.S. Pat. No. 3,640,681 issued Feb. 8, 1972. The zeolites having $SiO_2/Al_2O_3$ molar ratios increased by such means to the range of 20 to 200 are satisfactory for the present process.

Once produced, the $Cu^+$ zeolite is stable toward further reaction with water to oxidize the $Cu^+$ cations to $Cu^{++}$ cations with the consequent production of hydrogen. The reaction of equation (I) supra is however reversible but the exposure of the $Cu^+$ zeolite to oxidizing atmospheres such as air does tend to reconvert $Cu^+$ to $Cu^{++}$ cations over an extended period. Accordingly the $Cu^+$ zeolite products of the present process are found to be quite suitable as selective adsorbents for CO from gas streams such as vent gases from blast furnaces and the like, even though those gas streams contain significant amounts of water vapor.

In exemplification of the present process a sample of zeolite ZSM-5 having a framework Si/Al atomic ratio of 23 was ion-exchanged using a 1.0 normal aqueous solution of copper nitrate. The zeolite-water mixture was first adjusted to a pH of 3-4 with acetic acid in order to avoid precipitation of basic copper salts in the zeolite. After the exchange procedure, the $Cu^{++}$ form of the zeolite was thoroughly water washed and dried at 100° C. The $Cu^{++}$ zeolite was thereafter dehydrated and converted to the $Cu^+$ form by heating same in a stream of dry oxygen-free nitrogen at 300° C. for 3 hours. The sample did not develop any red or dark grey color which would indicate the formation of metallic copper or copper oxide. Further the strong esr (electron spin resonance) signal which characterized the starting $Cu^{++}$ form had diminished greatly following the dehydration treatment. The dehydrated sample was found to adsorb approximately 2 weight-% carbon monoxide at 50° C. under a pressure of 200 mm. Hg CO, thereby confirming the successful reduction of about 80% of the $Cu^{++}$ cations to $Cu^+$ cations in the zeolite.

In contrast, a sample of zeolite X having an Si/Al atomic ratio of 1.4 was ion exchanged with $Cu^{++}$ cations and dehydrated in accordance with the procedure specified above for the ZSM-5 sample. In this case the percent of $Cu^{++}$ cations converted to $Cu^+$ cations was less than about 2 percent.

What is claimed is:

1. Process for preparing zeolites containing $Cu^+$ cations which comprises providing a crystalline zeolite having pore diameters of at least 4 Angstroms, having a framework $SiO_2/Al_2O_3$ molar ratio of from 15 to 200 and containing bivalent copper cations, contacting and reacting said zeolite as a reagent with water at a temperature of from 200° C. up to the crystal destruction temperature of the zeolite, said zeolite reagent containing insufficient water of hydration to stabilize the bivalent copper cations thereof against reaction with said water.

2. Process according to claim 1 wherein the bivalent copper zeolite and water are reacted to form the monovalent copper form of the zeolite at a temperature of from 400° C. up to the crystal destruction temperature of the zeolite.

3. Process according to claim 2 wherein the zeolite starting material has a framework $SiO_2/Al_2O_3$ molar ratio of from 20 to 100.

* * * * *